US011238308B2

(12) United States Patent
Munoz

(10) Patent No.: US 11,238,308 B2
(45) Date of Patent: Feb. 1, 2022

(54) ENTROPIC CLUSTERING OF OBJECTS

(71) Applicant: Intel Corporation, Santa Clara, CA (US)

(72) Inventor: Jorge A. Munoz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 16/018,136

(22) Filed: Jun. 26, 2018

(65) Prior Publication Data

US 2019/0042879 A1    Feb. 7, 2019

(51) Int. Cl.
*G06K 9/62*     (2006.01)
*G06N 7/08*     (2006.01)
*G06N 20/00*    (2019.01)
*G06F 16/901*   (2019.01)
*G06N 5/02*     (2006.01)

(52) U.S. Cl.
CPC ....... *G06K 9/6218* (2013.01); *G06F 16/9024* (2019.01); *G06K 9/6224* (2013.01); *G06N 5/022* (2013.01); *G06N 5/025* (2013.01); *G06N 7/08* (2013.01); *G06N 20/00* (2019.01)

(58) Field of Classification Search
CPC .. G06K 9/6218; G06K 9/6224; G06K 9/6223; G06N 5/025; G06N 5/022; G06N 20/00; G06N 7/08; G06F 16/9024
See application file for complete search history.

(56) References Cited

U.S. PATENT DOCUMENTS

2003/0018939 A1* 1/2003 Kinoshita ...... G01R 31/318572
714/742

FOREIGN PATENT DOCUMENTS

WO    2017171826 A1    10/2017

OTHER PUBLICATIONS

European Search Report for European Patent Application No. 19175760.8, dated Nov. 13, 2019, 7 pages.
Hepp et al., "Recognition of Handprinted and Cursive Words by Finding Feature Correspondences" Document Recognition, Bellingham, Spie, US, vol. 2181, Feb. 9, 1994, pp. 47-58.
Wong et al., "Entropy and Distance of Random Graphs with Application to Structural Pattern Recognition" IEEE Transactions on Pattern Analysis and Machine Intelligence, IEEE Computer Society, USA, vol. 30, No. 5, Sep. 1, 1985, pp. 599-609.
Tran, Trung, "Hierarhical Identify Verify Exploit (HIVE) Program", DARPA Proposers Day Brief, darpa.mil/attachments/HIVE_Proposers_Day_PM_Briefing.pdf, 13 pages.
Shen, Wade, "Hierarchical Identify Verify Exploit (HIVE)", darpa.mil/program/hierarchical-identify-verify-exploit, retrieved on Mar. 8, 2018, 2 pages.

* cited by examiner

*Primary Examiner* — Robert G Bachner
(74) *Attorney, Agent, or Firm* — Jordan IP Law, LLC

(57) ABSTRACT

An embodiment of a semiconductor package apparatus may include technology to map a collection of data into two or more mathematical graph representations of the data based on a configurable set of rules that one of preserves or enhances relationships or properties of the data, and organize the two or more graph representations into two or more clusters of data based on graph information entropy and one or more parameters. Other embodiments are disclosed and claimed.

21 Claims, 10 Drawing Sheets

52

| IP address | Host | Bytes_rcv | Bytes_sent | extension | time_taken |
|---|---|---|---|---|---|
| 134.134.139.78 | www.cnn.com | 345 | 89 | jpg | 1 |
| 192.55.54.45 | www.google.com | None | 789 | None | 1 |
| 192.55.54.50 | www.google.com | 8754 | 200 | None | 4 |
| 134.134.89.78 | www.cars.com | 8754 | 89 | jpg | 13 |

52a, 52b

[134.134.139.78]

[134.134.89.78]

[134.134.139.78, 134.134.89.78]

ENTROPIC CLUSTERING OF OBJECTS

TECHNICAL FIELD

Embodiments generally relate to unsupervised machine learning. More particularly, embodiments relate to entropic clustering of objects.

BACKGROUND

Unsupervised machine learning may refer to a machine learning task of identifying structure in unlabeled data. One type of unsupervised learning may include cluster analysis or clustering. Clustering may refer to a task of grouping a set of objects in such a way that objects in the same group/cluster are more similar to each other than to objects in other groups/clusters based at least in part on one or more metrics. In the field of data mining, a k-means technique may refer to a process for grouping data into k clusters. A standard k-means technique may group the data based on a Euclidean distance between data points. A spherical k-means technique may group the data based on a cosine similarity between data points.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
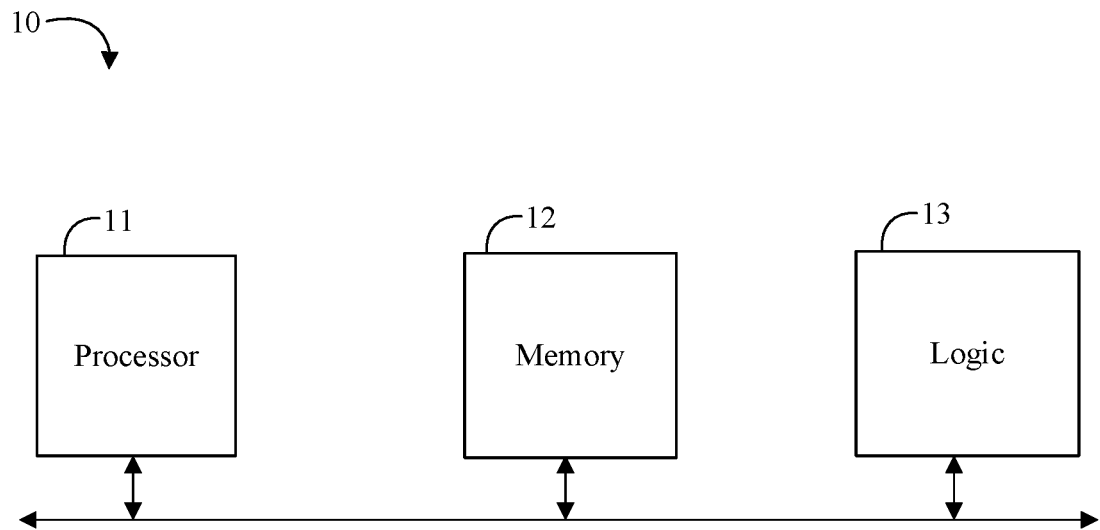
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to map a collection of data into two or more mathematical graph representations of the data based on a configurable set of rules that one of preserves or enhances relationships or properties of the data, and organize the two or more graph representations into two or more clusters of data based on graph information entropy and one or more parameters. For example, the logic 13 may be configured to apply a configurable set of rules that transforms the respective sets of data attributes into two or more graph representations, with node representations for each data attribute and connections and weights between nodes determined by the relationships or properties of the data that need to be enhanced or preserved. In some embodiments, the logic 13 may be further configured to select two or more graph representations as a new cluster candidate (e.g., randomly or in other suitable way), determine a graph information entropy per node of constituent graphs, determine the graph information entropy per node of the new cluster candidate, determine a transition probability for the new cluster candidate based on the one or more parameters and the difference between an average graph information entropy per node of the constituent graphs and the graph information entropy per node of the new cluster candidate, and one of keep or discard the new cluster candidate based on the determined transition probability. The logic 13 may also be configured to one of remove the constituent graphs if the new cluster candidate is kept or leave the constituent graphs intact if the new cluster candidate is discarded. The logic 13 may also be configured to determine if an end condition is met and, if the end condition is not met, to adjust one or more parameters, select a new group of two or more graph representations as the new cluster candidate (e.g., randomly or in other suitable way), determine the graph information entropy per node of the new cluster candidate based on the adjusted one or more parameters, determine the graph information entropy per node of constituent graph representations based on the adjusted one or more parameters, determine a transition probability for the new cluster candidate based on the adjusted one or more parameters, the graph information entropy per node of the cluster candidate, and the average graph information entropy per node of the constituent graph representations, and one of keep or discard the new cluster candidate based on the determined transition probability. In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, FiM++, PERL, JAVA, SMALLTALK, C++, C# or the like and conventional procedural programming languages, such as the "C" programming language or similar programming languages, and even esoteric programming languages such as LOLCODE and PIKACHU. For example, the memory 12, persistent storage media, or other system memory may store a set of instructions which when executed by the processor 11 cause the system 10 to implement one or more components, features, or aspects of the system 10 (e.g., the logic 13, mapping a collection of data into two or more mathematical graph representations of the data based on a configurable set of rules that one of preserves or enhances relationships or properties of the data, organizing the two or more graph representations into two or more clusters of data based on graph information entropy and one or more parameters, etc.).

Figure 2:
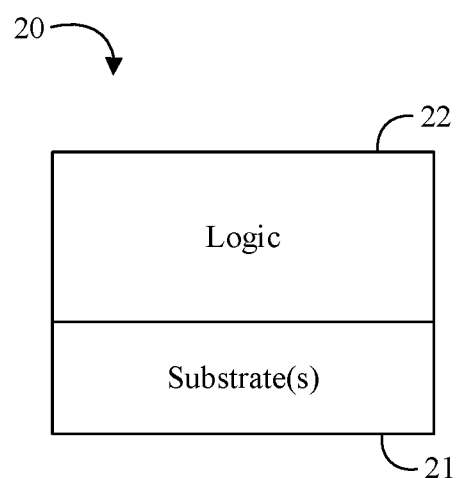
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to map a collection of data into two or more mathematical graph representations of the data based on a configurable set of rules that one of preserves or enhances relationships or properties of the data, and organize the two or more graph representations into two or more clusters of data based on graph information entropy and one or more parameters. For example, the logic 22 may be configured to apply a configurable set of rules that transforms the respective sets of data attributes into two or more graph representations, with node representations for each data attribute and connections and weights between nodes determined by the relationships or properties of the data that need to be enhanced or preserved. In some embodiments, the logic 22 may be further configured to select two or more graph representations as a new cluster candidate (e.g., randomly or in other suitable way), determine a graph information entropy per node of constituent graphs, determine the graph information entropy per node of the new cluster candidate, determine a transition probability for the new cluster candidate based on the one or more parameters and the difference between an average graph information entropy per node of the constituent graphs and the graph information entropy per node of the new cluster candidate, and one of keep or discard the new cluster candidate based on the determined transition probability. The logic 22 may also be configured to one of remove the constituent graphs if the new cluster candidate is kept or leave the constituent graphs intact if the new cluster candidate is discarded. The logic 22 may also be configured to determine if an end condition is met and, if the end condition is not met, to adjust one or more parameters, select a new group of two or more graph representations as the new cluster candidate (e.g., randomly or in other suitable way), determine the graph information entropy per node of the new cluster candidate based on the adjusted one or more parameters, determine the graph information entropy per node of constituent graph representations based on the adjusted one or more parameters, determine a transition probability for the new cluster candidate based on the adjusted one or more parameters, the graph information entropy per node of the cluster candidate, and the average graph information entropy per node of the constituent graph representations, and one of keep or discard the new cluster candidate based on the determined transition probability. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, FiM++, PERL, JAVA, SMALLTALK, C++, C# or the like and conventional procedural programming languages, such as the "C" programming language or similar programming languages, and even esoteric programming languages such as LOLCODE and PIKACHU.

The apparatus 20 may implement one or more aspects of the method 30 (FIGS. 3A to 3B), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
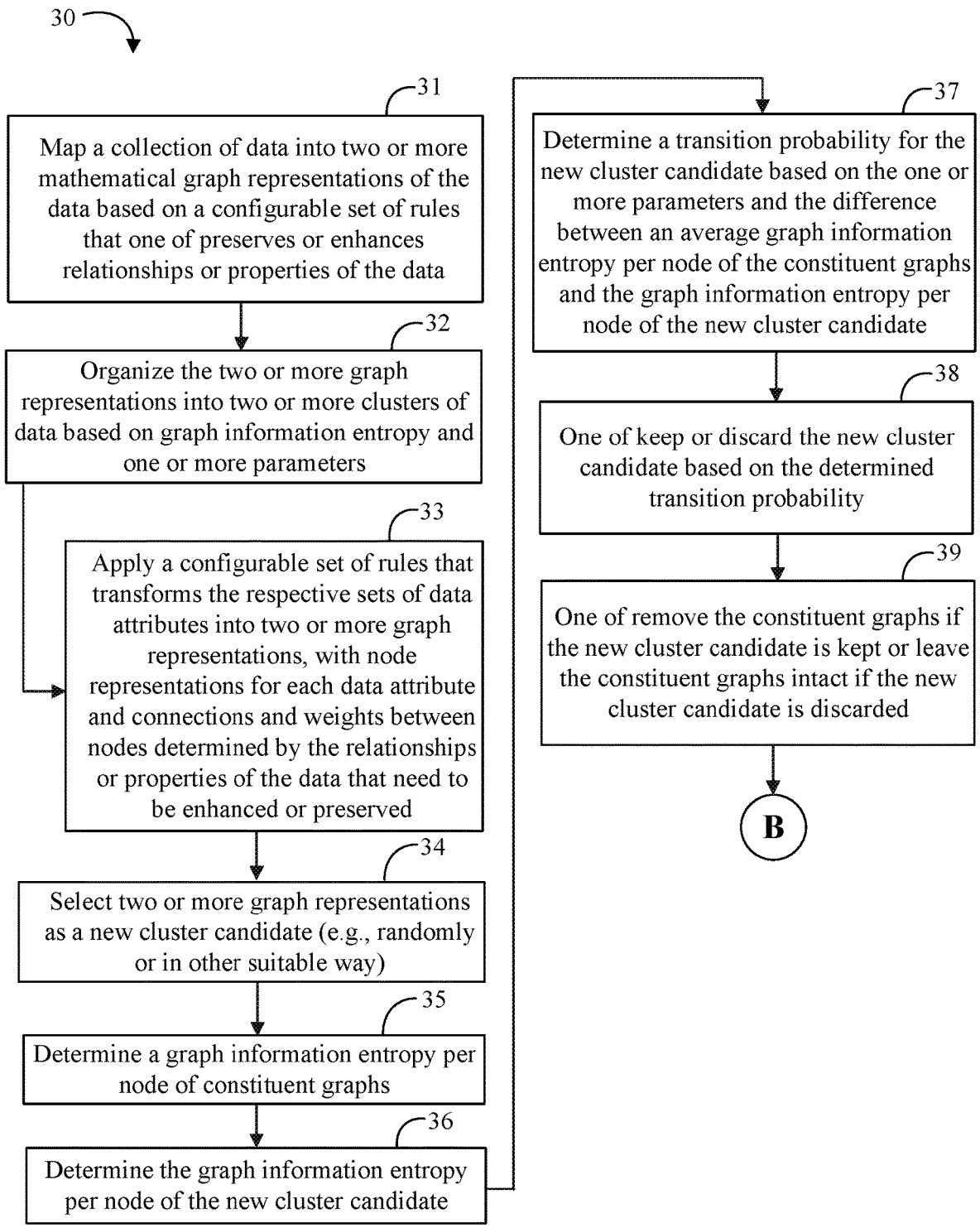
FIGS. 3A to 3B are flowcharts of an example of a method of unsupervised machine learning according to an embodiment.
Figure 3B:
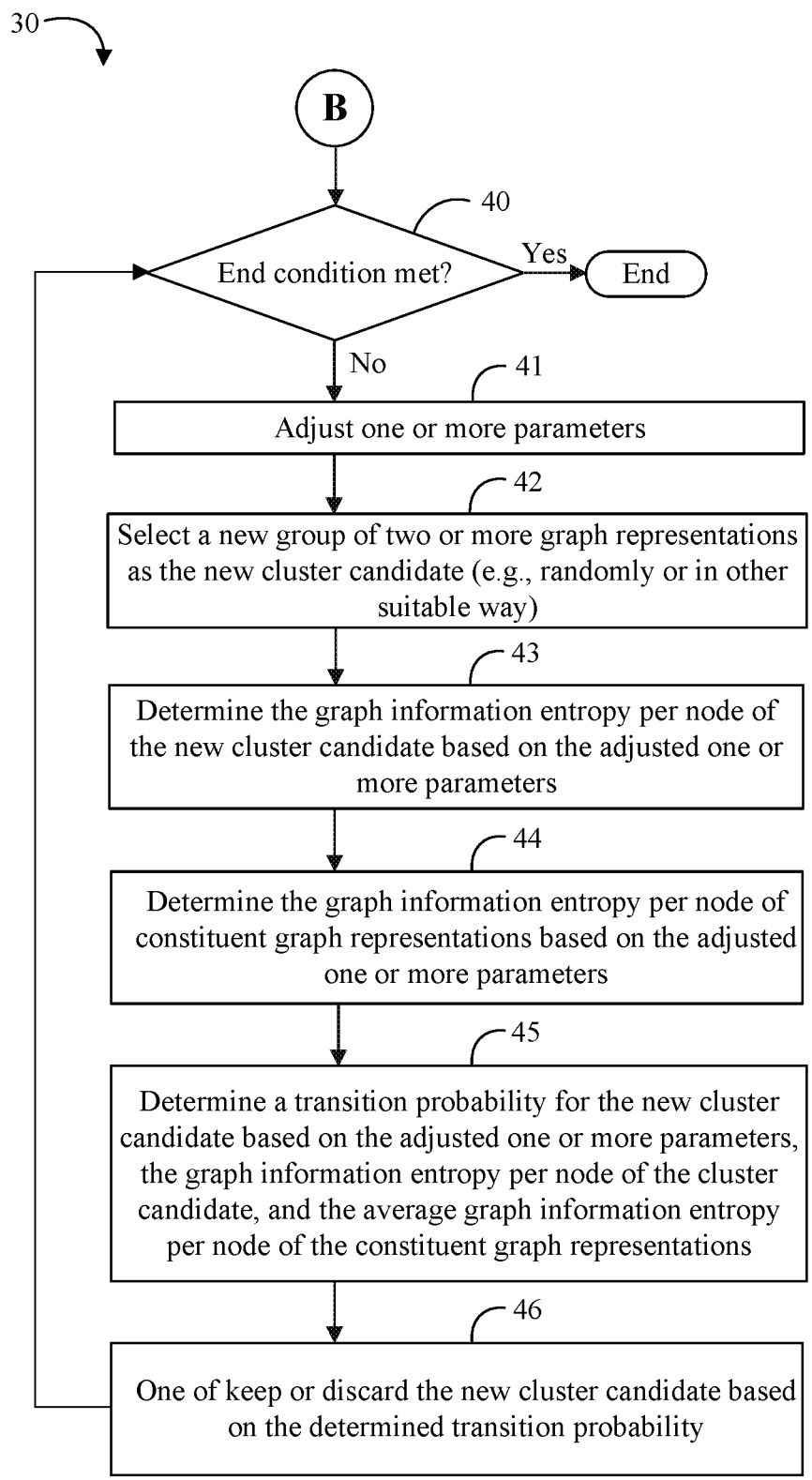

Turning now to FIGS. 3A to 3B, an embodiment of a method 30 of unsupervised machine learning may include mapping a collection of data into two or more mathematical graph representations of the data based on a configurable set of rules that one of preserves or enhances relationships or properties of the data at block 31, and organizing the two or more graph representations into two or more clusters of data based on graph information entropy and one or more parameters at block 32. For example, the method 30 may include applying a configurable set of rules that transforms the respective sets of data attributes into two or more graph representations, with node representations for each data attribute and connections and weights between nodes determined by the relationships or properties of the data that need to be enhanced or preserved at block 33. Some embodiments of the method 30 may further include selecting two or more graph representations as a new cluster candidate at block 34 (e.g., randomly or in other suitable way), determining a graph information entropy per node of constituent graphs at block 35, determining the graph information entropy per node of the new cluster candidate at block 36, determining a transition probability for the new cluster candidate based on the one or more parameters and the difference between an average graph information entropy per node of the constituent graphs and the graph information entropy per node of the new cluster candidate at block 37, and one of keeping or discarding the new cluster candidate based on the determined transition probability at block 38. The method 30 may also include one of removing the constituent graphs if the new cluster candidate is kept or leaving the constituent graphs intact if the new cluster candidate is discarded at block 39. The method 30 may also include determining if an end condition is met at block 40 and, if the end condition is not met, adjusting one or more parameters at block 41, selecting a new group of two or more graph representations as the new cluster candidate at block 42 (e.g., randomly or in other suitable way), determining the graph information entropy per node of the new cluster candidate based on the adjusted one or more parameters at block 43, determining the graph information entropy per node of constituent graph representations based on the adjusted one or more parameters at block 44, determining a transition probability for the new cluster candidate based on the adjusted one or more parameters, the graph information entropy per node of the cluster candidate, and the average graph information entropy per node of the constituent graph representations at block 45, and one of keeping or discarding the new cluster candidate based on the determined transition probability at block 46.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages, and even esoteric programming languages such as LOLCODE and PIKACHU.

For example, the method 30 may be implemented on a computer readable medium as described in connection with Examples 17 to 21 below. Embodiments or portions of the method 30 may be implemented in firmware, applications (e.g., through an application programming interface (API)), or driver software running on an operating system (OS).

Some embodiments may advantageously provide entropic clustering of objects. Some embodiments may be useful for performing unsupervised learning (e.g., a machine learning task of describing structure in unlabeled data), as opposed to supervised learning in which the learning algorithm may be trained with labeled data (e.g., pictures of cats and pictures of not cats) and then used to perform inference. Some other clustering techniques may discard data that has missing pieces or that has several values for the same attribute, or synthetic values may be used to fill in for missing data, thus decreasing its accuracy. Advantageously, some embodiments of entropic clustering technology may intrinsically deal with data that has missing pieces or several values for the same attribute.

Some embodiments of entropic clustering may be applied to a wide variety of real world applications of unsupervised learning. For example, some embodiments may include clustering of similar social media users that then are presented with targeted ads or e-commerce customers that are given suggestions to buy similar items. Some embodiments may be used to cluster together IP addresses based on their behaviors as logged in a network (e.g., IP addresses that show malicious or pernicious behavior may be identified). Some embodiments may cluster together hypermarkets based on their product sales profiles to identify effective promotions. Some embodiments may cluster together technical documents based on their authors and citation network (e.g., patents or scholarly articles of interest may be identified). Those skilled in the art will appreciate that these are only a few examples and that embodiments may be general and may be used to cluster many kinds of data.

Some embodiments may utilize graph-based technology. For example, some embodiments may incorporate or implement Defense Advanced Research Projects Agency (DARPA) Hierarchical Identify Verify and Exploit (HIVE) technology including software and/or hardware architectures for graph analytics. Unsupervised learning may include applications with significant economic impact such as social network "friend" suggestions, online retailer product recommendations, etc. The main classes of unsupervised learning techniques may include association rules, cluster analysis, self-organizing maps, and latent variable models. Some embodiments may provide an entirely new class of unsupervised learning (e.g., not rigorously in any of the foregoing classes, but with some resemblance to cluster analysis and association rules).

Some embodiments may include applications with significant military importance, such as unsupervised classification of false or misleading information disseminated by various entities, either intentionally or unintentionally, including hoaxes, disinformation campaigns, falsified news reports. Along with graph-based technology it could be used to study the dynamics of the spread of false information.

Some embodiments used with an efficient graph-based technology may have significant military and economic impact by performing Big Data summarization of large mixed and non-textual databases since the configurable set of rules is not limited to one type of data.

For the technical document clustering example, a standard procedure using association rules may include analyzing co-citation networks (e.g., pairs of documents that cite a document in common). For the network traffic example, a dissimilarity matrix may be built by applying a metric to differentiate between different variables (e.g., arguably CNN.com is closer to NBC.com than to ESPN.com). Conventional unsupervised learning technology may have difficulty in dealing with quantitative and categorical variables in the same model, may not be robust with missing attributes (e.g., often rows of data have to be discarded because of a single column with no value), may not be robust with data entities that have different number of attributes for the same feature (e.g., technical documents have at least one author but may have many more), and may not be straightforward to quantitatively and consistently calculate similarity between elements of clusters with non-numerical values. Some embodiments may advantageously overcome one or more of the foregoing problems with conventional unsupervised learning technology.

Figures 4, 5A:
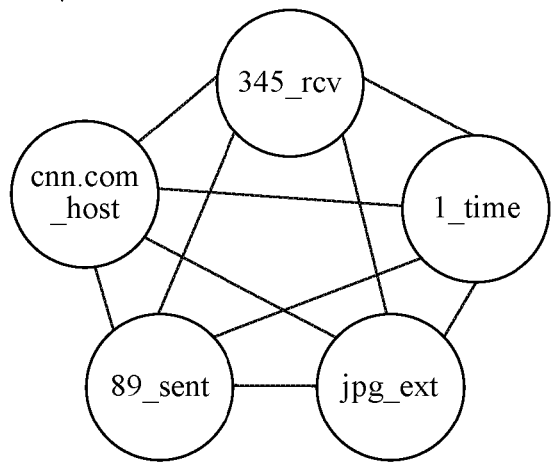
FIG. 4 is an illustrative diagram of an example of a collection of data according to an embodiment.
FIGS. 5A and 5B are illustrative graph representations of examples of respective clusters of data corresponding to the data collection in FIG. 4, according to an embodiment.

Turning now to FIG. 4, a collection of data 52 may include a table represented as columns and rows, with a row entry for each IP address and column entries for a host web address, a number of bytes received, a number of bytes sent, a file name extension, and an amount of time taken. Some of the table entries might be 'None' or missing. For example, the collection of data 52 may be derived from connection event information in network proxy log data. Some embodiments may cluster together IP addresses that behave similarly based on the network proxy log data.

Figure 5B:
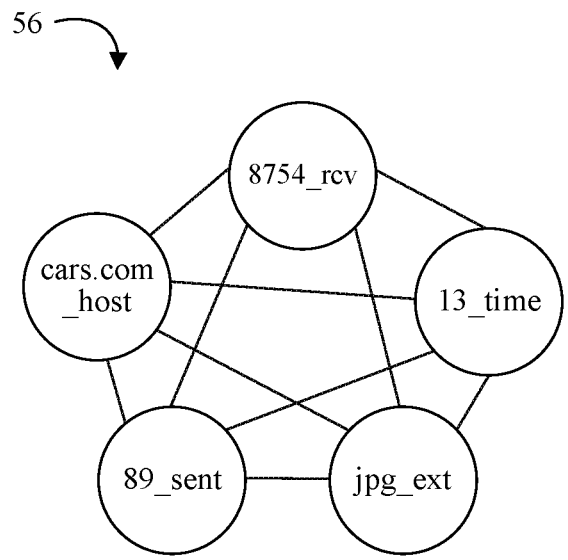

Turning now to FIGS. 5A and 5B, embodiments of respective graph representations 54 and 56 may correspond to rows 52a and 52b from FIG. 4. A morphism may refer to a structure-preserving or structure-enhancing map from one mathematical structure to another (e.g., a configurable set of rules/operations that transforms data but preserves or enhances certain relationships or properties of the data). For FIGS. 5A and 5B, a rule may be applied such that every attribute of a connection event (e.g., different columns in each row entry) may be represented as a node in a mathematical graph and edges may be represented between each node that belongs to the same connection event (e.g., the same row in the collection of data 52). The number of graphs created may be equal to the number of connection events in the log (e.g., graph representation may also be created for the other IP addresses in the collection of data 52). In some embodiments, weights may be specified for edges between different attributes, different rules may be specified, and/or additional rules may be specified.

Some embodiments may utilize discrete random variables, such that continuous variables may be discretized. For example, the discretization process may be part of the morphism. Selection of appropriate morphisms for a particular dataset may be considered feature engineering. In some embodiments, the numerical value of the variable may be converted to text (e.g., 89 bytes sent may be represented as "89_sent"). Another morphism may indicate that numerical value be converted based on a function of the log base 10 of the numerical value (e.g., 89 bytes sent may be represented as "1_sent", 200 bytes sent may be represented as "2_sent", 345 bytes received may be represented as "2_rcv", etc.), such that the number of bytes having the same order of magnitude are grouped in the same bin and given the same label. For some datasets, utilizing an order of magnitude separation may put typical office documents, software updates, movies, etc., in different bins and may improve the quality of the clustering. Other morphisms may be useful for other applications (e.g., to bin continuous values into even-sized bins, bins based on the percentile compared to all the values present, etc.).

Figure 6:
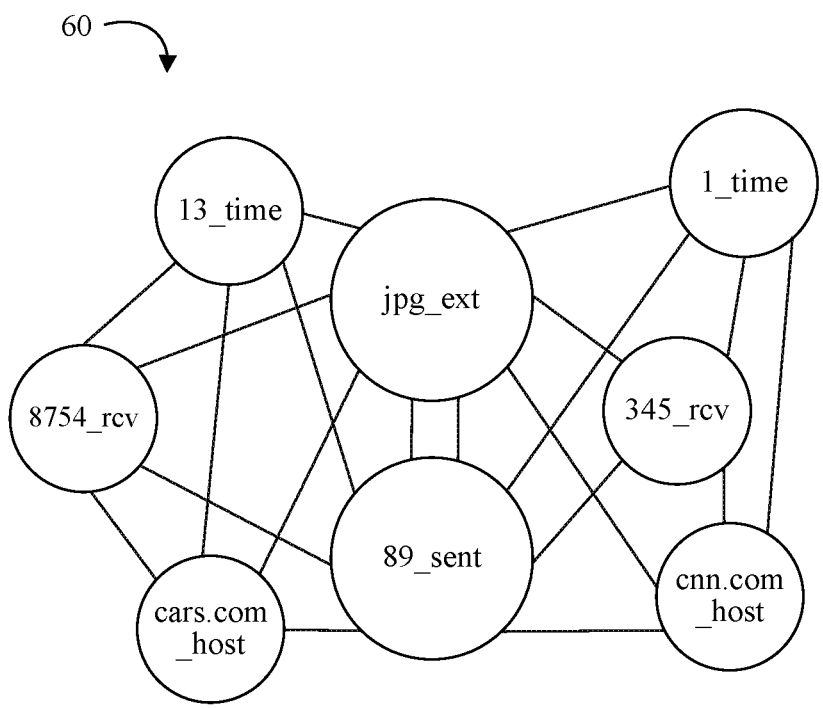
FIG. 6 is an illustrative graph representation of an example of a merged cluster of data corresponding to the clusters of data in FIGS. 5A and 5B, according to an embodiment.

Turning now to FIG. 6, an embodiment of a merged graph representation 60 may correspond to merged data from the two graph representations 54 and 56. The represented area of the nodes is approximately proportional to their occupation probability. All the nodes in the graph representations 54 and 56 may have the same occupation probability (e.g., uniform probability), and may be illustrated with nodes of the same size. After the graphs 54, 56 have been merged, in the graph 60 the nodes labeled "jpg_ext" and "89_sent" have a higher occupation probability than the others because they have more edges (e.g., the edges from the graph 54 are combined with the edges from the graph 56). Accordingly, the nodes labeled "jpg_ext" and "89_sent" may be illustrated as larger than the other nodes.

In some embodiments, after the graphs 54, 56 are generated, groups of graphs (e.g., pairs, triplets, etc.) may be selected randomly or in other suitable way and the graph information entropy (hereinafter "gentropy") per node of each graph as well as the gentropy per node of the merged graph (e.g., the graph 60) may be calculated. In some embodiments, the gentropy of a graph may be determined as:

$$G(X) = \Sigma_i P(x_i) \log_2 P(x_i) \quad [\text{Eq. 1}]$$

where X is a discrete random variable and $P(x_i)$ is the stationary occupation probability of node i based on the number of directed or undirected edges and the occupation probabilities of neighboring vertices. For example, Eq. 1 may correspond to a Shannon information entropy applied to a mathematical graph, and the information entropy may be maximal for a uniform probability distribution.

Accordingly, the graphs 54, 56 (e.g., with a uniform occupation probability) may have a higher gentropy per node than the graph 60, and the gentropy of merging per node may be negative. In general, the gentropy of merging per node E may be determined as:

$$\epsilon = G_{A+B+} \ldots - \text{avg}(G_{A,B} \ldots) \quad [\text{Eq. 2}]$$

where $G_{A+B+} \ldots$ may represent the gentropy per node of the merged graph and $\text{avg}(G_{A,B} \ldots)$ may correspond to the average gentropy per node of the constituent graphs. To cluster similar elements, some embodiments may assign a larger probability of becoming a single graph to those transactions that result in a large and negative gentropy of merging per node.

Any suitable technology may be utilized to determine the occupation probability. In some embodiments, the occupation probability of the nodes may be calculated efficiently using the PageRank technique such as those implemented in open-source projects (e.g., Apache Spark GraphX). Other suitable techniques may include traversing the graph multiple times and utilizing the central limit theorem (exploiting the ergodicity of the system). Some embodiments may be well suited to run even faster on architectures optimized for graph analytics. Once E is calculated, a transition probability n may be computed based at least in part on a sigmoid function. For example, the Fermi-Dirac distribution may be utilized. In some embodiments, the transition probability n may be determined as follows:

$$n = 1/(e^{(\epsilon - \mu)/kT} + 1) \quad [\text{Eq. 3}]$$

where μ and k may be adjustable parameters that remain static throughout a determination and T may be a 'temperature' parameter that may be decreased at each step. Some embodiments may use other distributions as well, such as a Boltzmann distribution.

Figure 7:
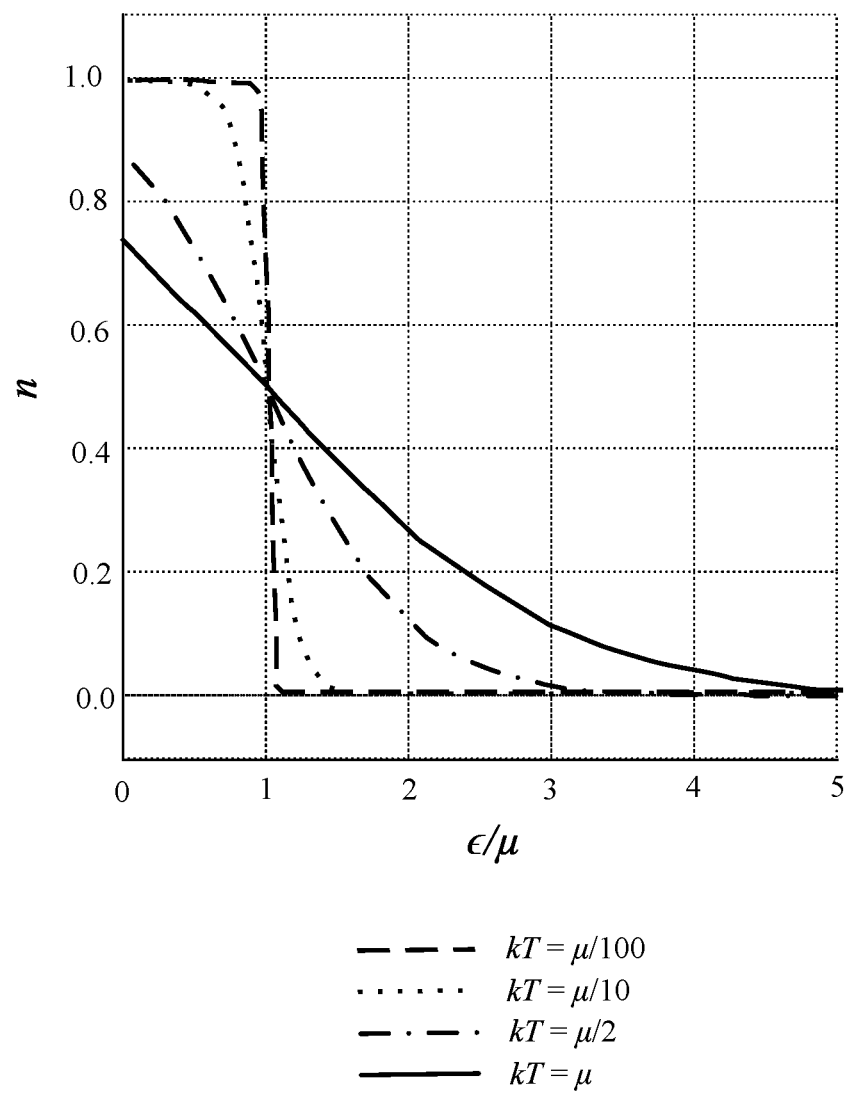
FIG. 7 is a graph of an example of a Fermi-Dirac distribution according to an embodiment.

Turning now to FIG. 7, an embodiment of a graph of n versus ϵ/μ may illustrate a Fermi-Dirac distribution at different temperatures T, with T given in terms of the parameters k and μ, where k may represent the Boltzmann constant and μ may represent a chemical potential. FIG. 7 shows how the Fermi-Dirac distribution may provide a step function at very low T values, with a transition probability of substantially 100 percent if the gentropy of merging per node is negative and substantially 0 percent otherwise. At higher values of T, there is a probability that a merge will be accepted even with a positive gentropy of merging per node, but the determination may still transition preferentially to higher similarity states. Some embodiments may start an analysis at high temperature to preclude the determination from ending up in a local minimum. Some embodiments may aggregate the results of multiple runs to produce more robust results.

Some embodiments may utilize more data attributes to decrease the variation of the clusters between determinations. For example, using only one attribute such as the file extension, the clusters may not be reproducible or stable. Using all five attributes in FIG. 5, however, may result in consistent clustering and the results from multiple runs may be aggregated. Some embodiments may advantageously translate an unsupervised learning problem into an optimization problem to be solved via simulated annealing. For example, the functional to be minimized may correspond to the gentropy per node of the system, which may itself be a function of the configuration (e.g., the clusters) of the system. Some embodiments may advantageously apply thermodynamics concepts for clustering of data, including determining gentropy as a similarity measure for clustering.

In some embodiments, rows of data may be transformed into mathematical graph representations in which the data attributes become nodes. The nodes of the graphs may be connected through edges if the nodes belong to the same row (e.g., see FIGS. 4, 5A and 5B). In some embodiments, different graphs may be selected randomly or in other suitable way and the graphs' gentropy of merging per node (e.g., Eqs. 1 and 2) and transition probability (e.g., Eq. 3) may be calculated to determine if the nodes should be permanently merged. This analysis may be repeated until a desired number of clusters or other end condition is reached. Advantageously, some embodiments may be robust for datasets in which the data have missing attributes, different numbers of attributes, or different types of attributes. Such data robustness may increase the number of useful applications for unsupervised machine learning because many potential real world use cases may include data collections that are not well-ordered or clean.

Once the clusters have been defined, the similarity of data elements not in the original data set with particular clusters may be estimated by calculating the gentropy of merging per node of the new element with those clusters. This quantity may then be used to decide whether the new element belongs to a given cluster or not, e.g., using a cutoff. For example, the calculation of the similarity of an unknown IP address to those in a cluster of known malicious IP addresses may help determine if the unknown IP address is a potential security threat.

In another example application, a collection of data may include thousands of technical documents belonging broadly to the same field and for which classification codes have been assigned by human experts. The classification codes represent the human-defined structure of the data. An embodiment may organize the documents into 100 clusters. Other termination conditions may include no new clusters are formed after a given number of steps, the global entropy is calculated and it does not change after a given number of steps, etc.

In this example application, an individual document may correspond to a data row and the attributes may include author(s), reference(s) to other publications, the number of references, and the topics as determined from text analytics. Note that classification codes are not part of the input and also that some attributes have numerical values and others have nominal values. The morphism may transform the attributes into graph nodes and the nodes may be connected by edges if they are part of the same document. The morphism may be a representation of the configurable rules that produce structure and may be systematically modified until the results produce useful clusters (e.g., feature engineering). In general, the number of authors and references will be different for different documents, and some documents even have zero references, but the method is still able to cluster the document based on the remaining attributes. Some embodiments may provide an important advantage over technologies that represent data with vectors, since the absence of an attribute in some cases may result in the whole data element being removed from the clustering, or missing values may be replaced with fictitious values based on the statistical properties of the dataset. Some embodiments may advantageously consistently represent similarities using a graph (e.g., instead of defining a distance metric in Euclidean space to represent similarities).

A heat map may represent the normalized frequency with which a classification code appears in the documents of a cluster. In some examples, all or almost all of the documents with a particular classification code ended up in the same cluster (so the frequency is almost 100%). For a classification system that is designed such that classification codes that are closely related appear alphanumerically close to each other, such as the Cooperative Patent Classification System, most of the intensity may appear in localized regions (e.g., higher intensity squares may be close to each other). For different collections of documents/data, some embodiments may advantageously identify structure in the documents/data based on the applied set of rules. If the analysis did not identify useful structure, the parameters may be adjusted and/or the morphism (rules) may be systematically changed (e.g., weights of connections between attributes, etc.) until structure is found (e.g., which may indicate that the rules are appropriate, consistent with each other, etc.).

Figure 8:
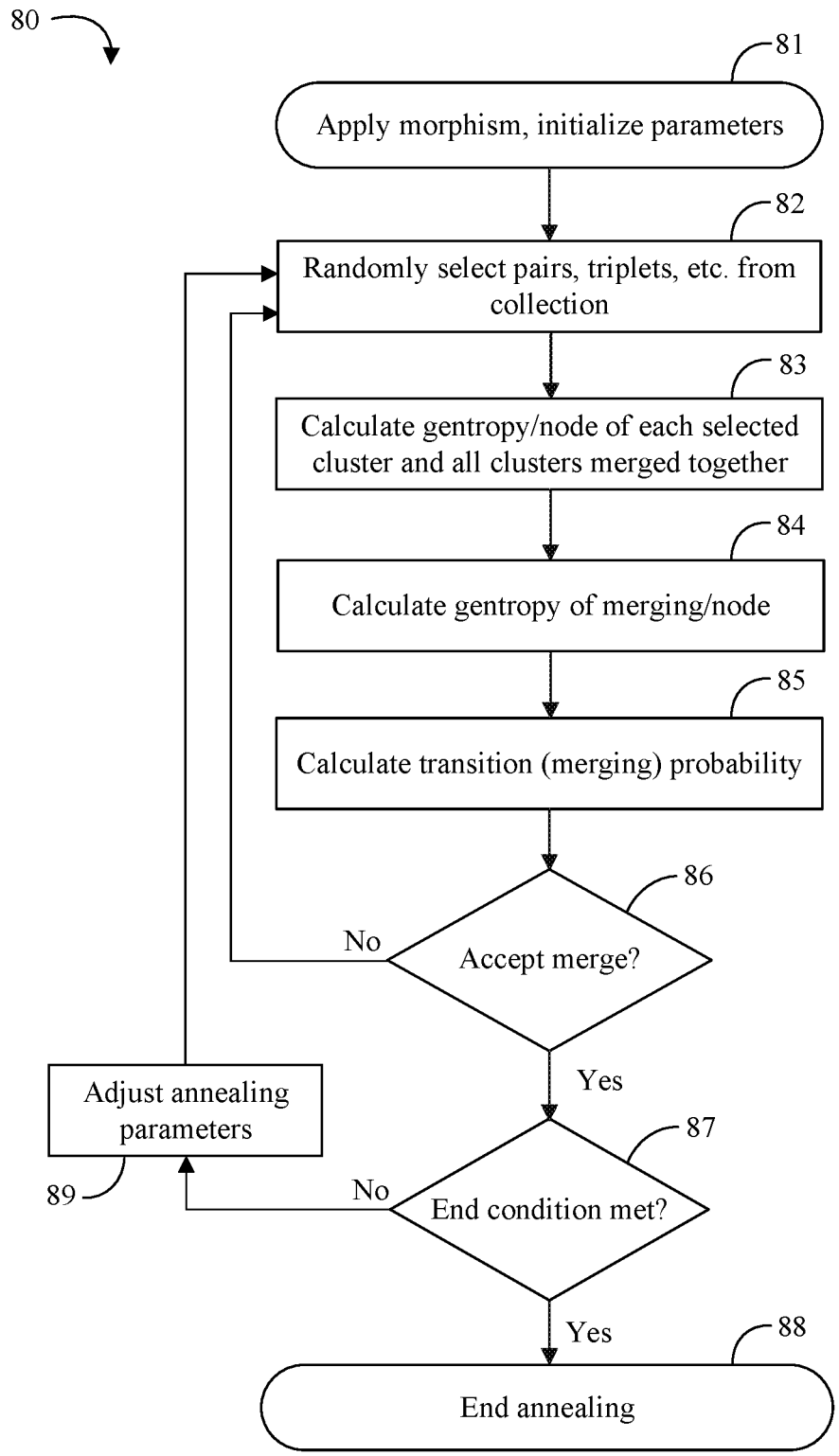
FIG. 8 is a flowchart of an example of a method of entropic clustering of a data object according to an embodiment.

Turning now to FIG. 8, an embodiment of a method 80 of entropic clustering of data objects may include applying a morphism and initializing parameters at block 81. For example, some embodiments may advantageously provide techniques, executed locally or in the cloud, that may apply a user-supplied morphism to a collection of data to map their attributes from their original format to a property graph. The method 80 may then provide techniques, executed locally or in the cloud for randomly or in other suitable way selecting pairs, triplets, etc. of clusters from the collection at block 82 (e.g., the initial condition is that each data entity is a cluster), calculating the gentropy per node of each cluster selected in block 82, as well as the gentropy per node of the selected clusters merged together at block 83 (e.g., utilizing Eq. 1), calculating the gentropy of merging per node at block 84 (e.g., the difference between the gentropy per node of the selected clusters merged together and the average gentropy per node of the selected clusters; utilizing Eq. 2), and calculating the probability of merging at block 85 (e.g., the transition probability from one state to the next) based on a function of the gentropy of merging per node and the temperature parameter (e.g., utilizing Eq. 3).

The method 80 may then include determining whether to accept the merge at block 86. For example, some embodiments may either update the collection with the new cluster or may discard the new cluster in favor of the original clusters based on the probability of merging. If the merge is not accepted at block 86, the method 80 may return to block 82 for randomly or in other suitable way selecting another group of data from the collection. If the merge is accepted at block 86, the method 80 may then include determining if an end condition is met at block 87. If so, the method 80 may end the simulation at block 88. Otherwise, the method 80 may include adjusting one or more of the annealing parameters at block 89 (e.g., decreasing the temperature T, but in some embodiments also adjusting k, u, etc.), and returning to block 82 for randomly or in other suitable way selecting another group of data from the collection. Some embodiments may include multiple passes of the method 80 to find structure in the dataset, which in some embodiments may include aggregating the results of multiple passes of the method 80. After the dataset is organized into suitable clusters, some embodiments may include determining how similar (e.g., or dissimilar) data not in the original set may be to the resulting clusters by calculating the gentropy of merging per node between the new data entity and each cluster. Further actions may then be taken based on the determination (e.g., identifying an IP address as potentially malicious, identifying a relevant technology area of a document, providing a product recommendation, etc.).

In other clustering technologies, vectors may be used to represent quantities that have both magnitude and direction relative to the basis vectors of the vector space. In 3-D Euclidian space, for example, the following vector [1.5, 0.5, 1.2] could represent an 'arrow' with its origin at [0, 0, 0] and ending at a point 1.5 units in the x-direction, 0.5 units in the y-direction, and 1.2 units in the z-direction and the x, y, and z directions are defined by basis (unit) vectors that are orthogonal to each other. Rotation, translation, etc. operations may be applied to the vector, but the resulting vector still resides in the same vector space created by x, y, and z. Many clustering techniques may rely on defining a metric to translate the problem to Euclidean space (e.g., usually high-dimensional). Graphs may also be represented by matrices. Some embodiment may provide a binary graph operation to join two graphs and the join operation may also include a matrix representation. Because embodiments of the graph representations (e.g., typically adjacency matrices) do not represent a vector space, however, some embodiments are free to add a node to a graph (e.g., among other things, which may include adding a row and column to a matrix representation). In Euclidean space, the implied addition of a dimension may be incompatible with the original vectors, which would not be defined in the new dimension. Some embodiments may provide powerful clustering technology that is extensible in many dimensions without discarding data that is not defined in each dimension.

Figure 9A:
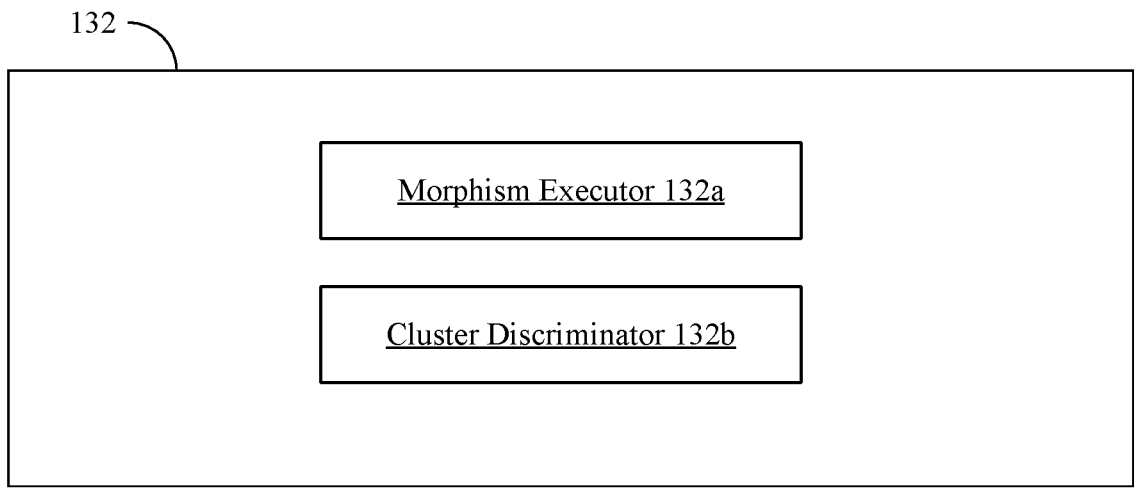
FIGS. 9A and 9B are block diagrams of examples of entropic cluster apparatuses according to embodiments.

FIG. 9A shows an entropic clustering apparatus 132 (132a-132b) that may implement one or more aspects of the method 30 (FIGS. 3A to 3B) and/or the method 80 (FIG. 8). The entropic clustering apparatus 132, which may include logic instructions, configurable logic, fixed-functionality hardware logic, may be readily substituted for the system 10 (FIG. 1), already discussed. A morphism executor 132a may map respective sets of attributes from a collection of data into two or more graph representations of the data based on a configurable set of rules. A cluster discriminator 132b may organize the two or more graph representations into two or more clusters based on gentropy. In some embodiments, the morphism executor 132a may be configured to transform the respective sets of data attributes into the two or more graph representations based on the configurable set of rules, with node representations for each data attribute and connections and weights between nodes determined by the relationships or properties of the data that need to be enhanced or preserved. The cluster discriminator 132b may randomly or in other suitable way select two or more graph representations as a new cluster candidate, determine a gentropy per node of the constituent graphs, determine the gentropy per node of the new cluster candidate, determine a transition probability for the new cluster candidate based on the one or more parameters and the difference between an average gentropy per node of the constituent graphs and the gentropy per node of the new cluster candidate, and keep or discard the new cluster candidate based on the determined transition probability.

For example, the cluster discriminator 132b may also be configured to determine if an end condition is met and, if the end condition is not met, to adjust one or more parameters and repeat the cluster analysis. In particular, some embodiments of the cluster discriminator 132b may randomly or in other suitable way select a new group of two or more graph representations as the new cluster candidate, determine a gentropy per node of the constituent graphs, determine the gentropy per node of the new cluster candidate, determine a transition probability for the new cluster candidate based on the one or more parameters and the difference between an average gentropy per node of the constituent graphs and the gentropy per node of the new cluster candidate, and keep or discard the new cluster candidate based on the determined transition probability. In some embodiments, the morphism executor 132a may be further configured to apply a new configurable set of rules that transforms the respective sets of data attributes into two or more graph representations, with node representations for each data attribute and connections and weights between nodes determined by the relationships or properties of the data that need to be enhanced or preserved, and the cluster discriminator 132b may organize the new set of two or more graph representations into a new set of two or more clusters of data, and the entropic clustering apparatus 132 may aggregate results from the original two or more clusters and the new set of two or more clusters. In any of the embodiments described herein, the entropic clustering apparatus 132 may also be configured to determine a gentropy of merging per node between a new data object and/or collection and each of the two or more clusters of data.

Figure 9B:
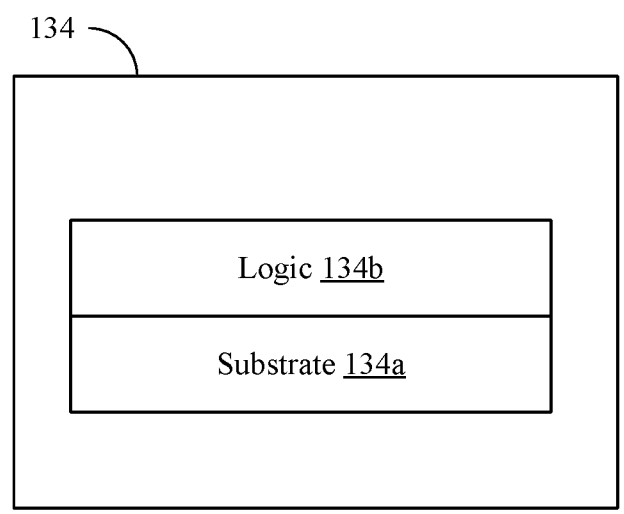

Turning now to FIG. 9B, entropic clustering apparatus 134 (134a-134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 30 (FIGS. 3A to 3B) and/or the method 80 (FIG. 8). Thus, the logic 134b may map respective sets of attributes from a collection of data into two or more graph representations of the data based on a configurable set of rules, and organize the two or more graph representations into two or more clusters of data based on gentropy. In some embodiments, the logic 134b may be configured to transform the respective sets of data attributes into the two or more graph representations based on the configurable set of rules, with node representations for each data attribute and connections and weights between nodes determined by the relationships or properties of the data that need to be enhanced or preserved, randomly or in other suitable way select two or more graph representations as a new cluster candidate, determine a gentropy per node of the constituent graphs, determine the gentropy per node of the new cluster candidate, determine a transition probability for the new cluster candidate based on the one or more parameters and the difference between an average gentropy per node of the constituent graphs and the gentropy per node of the new cluster candidate, and keep or discard the new cluster candidate based on the determined transition probability.

For example, the logic 134b may also be configured to determine if an end condition is met and, if the end condition is not met, to adjust one or more parameters and repeat the cluster analysis. In particular, some embodiments of the logic 134b may randomly or in other suitable way select a new group of two or more graph representations as the new cluster candidate, determine a gentropy per node of the constituent graphs based on the adjusted one or more parameters, determine the gentropy per node of the new cluster candidate based on the adjusted one or more parameters, determine a transition probability for the new cluster candidate based on the adjusted one or more parameters and the difference between an average gentropy per node of the constituent graphs based on the adjusted one or more parameters and the gentropy per node of the new cluster candidate based on the adjusted one or more parameters, and keep or discard the new cluster candidate based on the determined transition probability based on the adjusted one or more parameters. In some embodiments, the logic 134*b* may be further configured to apply a new configurable set of rules, with node representations for each data attribute and connections and weights between nodes determined by the relationships or properties of the data that need to be enhanced or preserved, organize the new set of two or more graph representations into a new set of two or more clusters of data, and aggregate results from the two or more determinations. In any of the embodiments described herein, the logic 134*b* may also be configured to determine a gentropy of merging per node between a new data object and/or collection and each of the two or more clusters of data. In one example, the apparatus 134 is a semiconductor die, chip and/or package.

Figure 10:
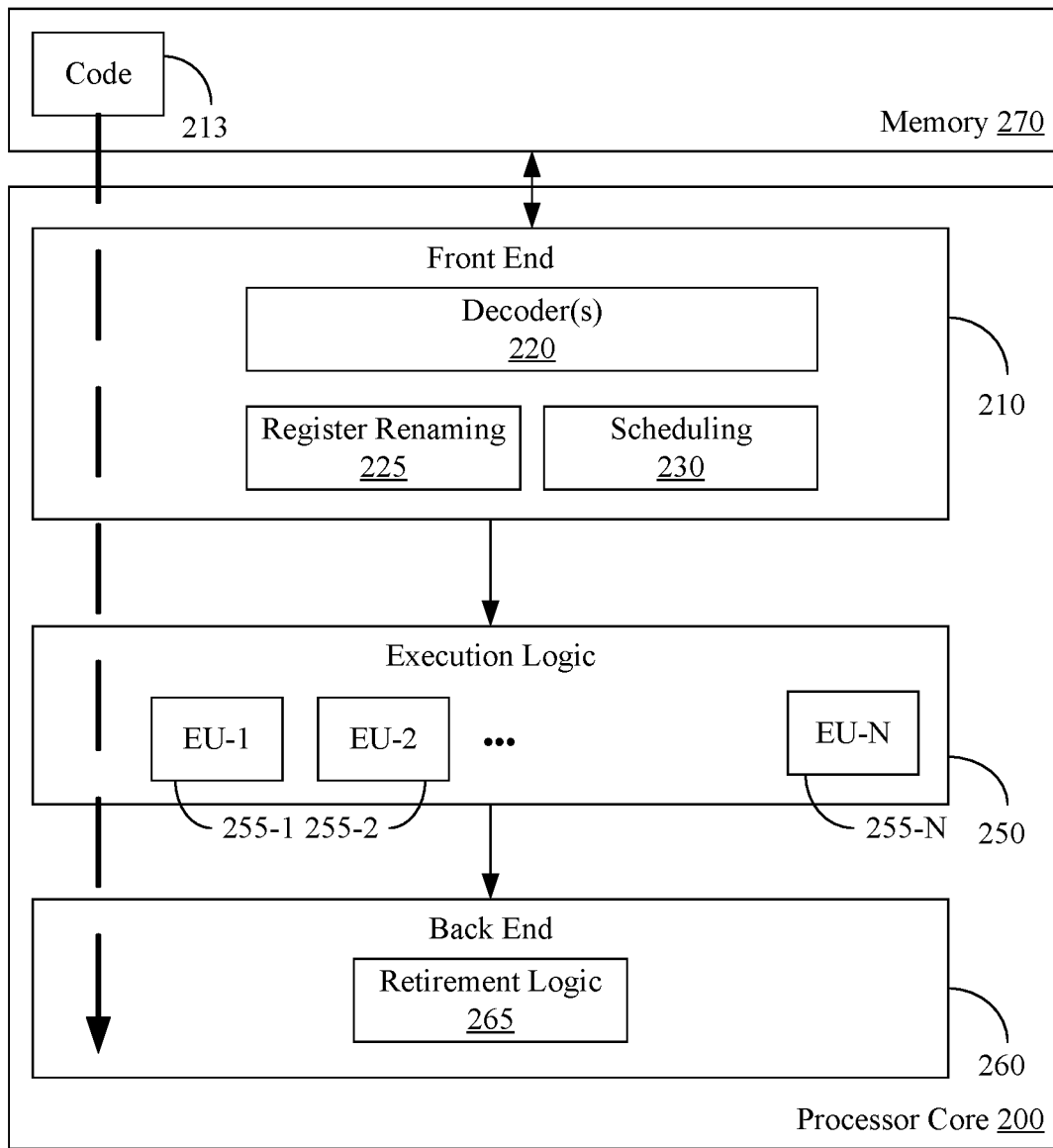
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIGS. 3A to 3B) and/or the method 80 (FIG. 8), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Although not illustrated in FIG. 10, the processor core 200 and memory 270 may be optimized for graph analytics. For example, a processor core 200 and memory 270 may utilize non-volatile memory such as stackable cross-gridded data access array, utilize linear algebra building blocks which can be accelerated (graph primitives), utilize a data format model that maps graph matrices into subarrays which conveniently allow memory mapping, or use a data flow model that efficiently moves graph primitives between memory 270 and processor core 200.

Figure 11:
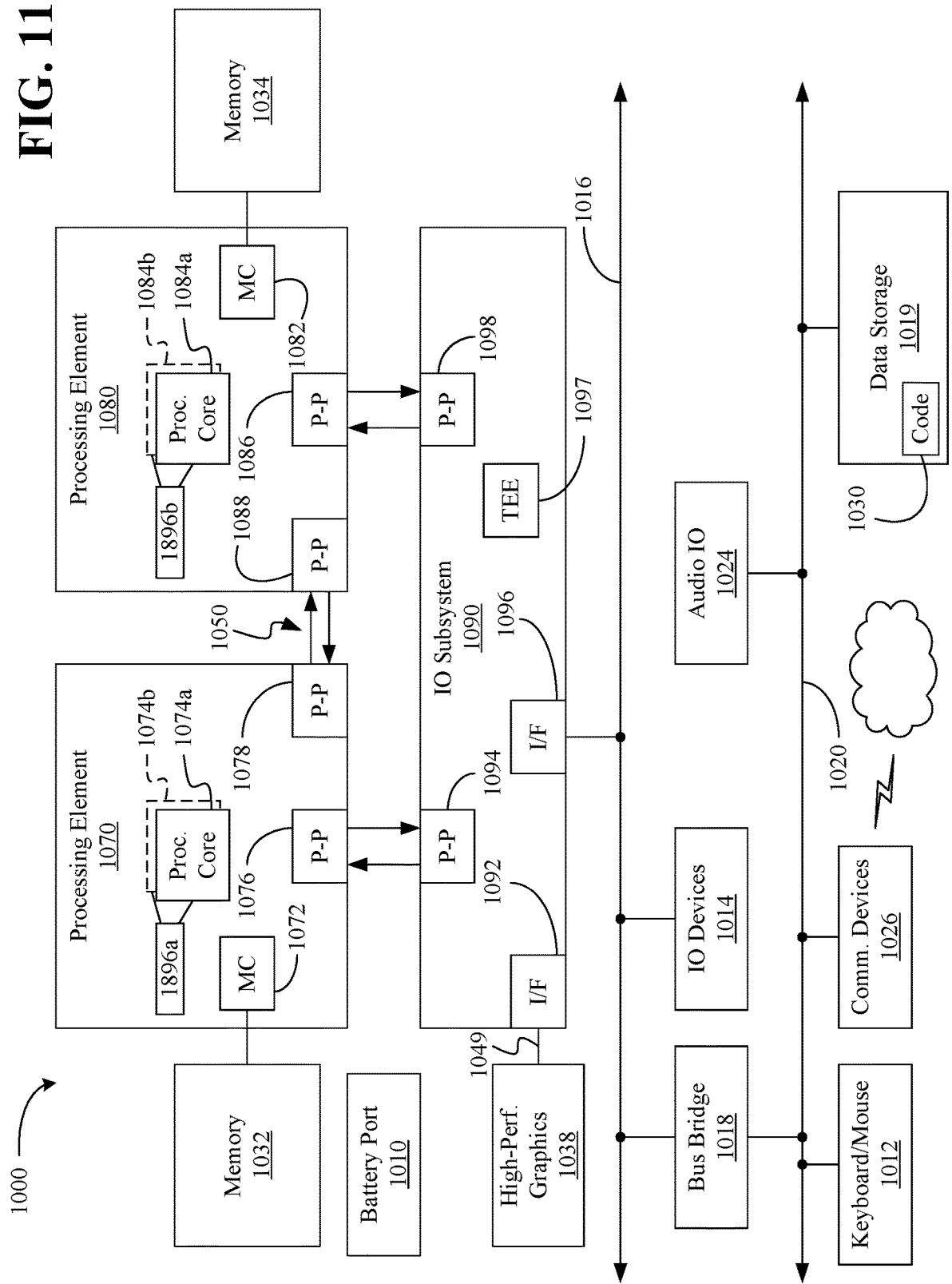
FIG. 11 is a block diagram of an example of a system according to an embodiment.

Referring now to FIG. 11, shown is a block diagram of a system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 10.

Each processing element 1070, 1080 may include at least one shared cache 1896*a*, 1896*b* (e.g., static random access memory/SRAM). The shared cache 1896*a*, 1896*b* may store data (e.g., objects, instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIGS. 3A to 3B) and/or the method 80 (FIG. 8), already discussed, and may be similar to the code 213 (FIG. 10), already discussed. Further, an audio I/O 1024 may be coupled to second bus 1020.

Note that other embodiments are contemplated. For example, instead of the point-to-point architecture of FIG. 11, a system may implement a multi-drop bus or another such communication topology.

ADDITIONAL NOTES AND EXAMPLES

Example 1 may include an electronic processing system, comprising a processor, memory communicatively coupled to the processor, and logic communicatively coupled to the processor to map a collection of data into two or more mathematical graph representations of the data based on a configurable set of rules that one of preserves or enhances relationships or properties of the data, and organize the two or more graph representations into two or more clusters of data based on graph information entropy and one or more parameters.

Example 2 may include the system of Example 1, wherein the logic is further to apply a configurable set of rules that transforms the respective sets of data attributes into two or more graph representations, with node representations for each data attribute and connections and weights between nodes determined by the relationships or properties of the data that need to be enhanced or preserved.

Example 3 may include the system of Example 2, wherein the logic is further to randomly or in other suitable way select two or more graph representations as a new cluster candidate, determine a graph information entropy per node of constituent graphs, determine the graph information entropy per node of the new cluster candidate, determine a transition probability for the new cluster candidate based on the one or more parameters and the difference between an average graph information entropy per node of the constituent graphs and the graph information entropy per node of the new cluster candidate, and one of keep or discard the new cluster candidate based on the determined transition probability.

Example 4 may include the system of Example 3, wherein the logic is further to one of remove the constituent graphs if the new cluster candidate is kept or leave the constituent graphs intact if the new cluster candidate is discarded.

Example 5 may include the system of Example 4, wherein the logic is further to determine if an end condition is met and, if the end condition is not met, to adjust one or more parameters, randomly or in other suitable way select a new group of two or more graph representations as the new cluster candidate, determine the graph information entropy per node of the new cluster candidate based on the adjusted one or more parameters, determine the graph information entropy per node of constituent graph representations based on the adjusted one or more parameters, determine a transition probability for the new cluster candidate based on the adjusted one or more parameters, the graph information entropy per node of the cluster candidate, and the average graph information entropy per node of the constituent graph representations, and one of keep or discard the new cluster candidate based on the determined transition probability.

Example 6 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to map a collection of data into two or more mathematical graph representations of the data based on a configurable set of rules that one of preserves or enhances relationships or properties of the data, and organize the two or more graph representations into two or more clusters of data based on graph information entropy and one or more parameters.

Example 7 may include the apparatus of Example 6, wherein the logic is further to apply a configurable set of rules that transforms the respective sets of data attributes into two or more graph representations, with node representations for each data attribute and connections and weights between nodes determined by the relationships or properties of the data that need to be enhanced or preserved.

Example 8 may include the apparatus of Example 7, wherein the logic is further to randomly or in other suitable way select two or more graph representations as a new cluster candidate, determine a graph information entropy per node of constituent graphs, determine the graph information entropy per node of the new cluster candidate, determine a transition probability for the new cluster candidate based on the one or more parameters and the difference between an average graph information entropy per node of the constituent graphs and the graph information entropy per node of the new cluster candidate, and one of keep or discard the new cluster candidate based on the determined transition probability.

Example 9 may include the apparatus of Example 8, wherein the logic is further to one of remove the constituent graphs if the new cluster candidate is kept or leave the constituent graphs intact if the new cluster candidate is discarded.

Example 10 may include the apparatus of Example 9, wherein the logic is further to determine if an end condition is met and, if the end condition is not met, to adjust one or more parameters, randomly or in other suitable way select a new group of two or more graph representations as the new cluster candidate, determine the graph information entropy per node of the new cluster candidate based on the adjusted one or more parameters, determine the graph information entropy per node of constituent graph representations based on the adjusted one or more parameters, determine a transition probability for the new cluster candidate based on the adjusted one or more parameters, the graph information entropy per node of the cluster candidate, and the average graph information entropy per node of the constituent graph representations, and one of keep or discard the new cluster candidate based on the determined transition probability.

Example 11 may include the apparatus of any of Examples 7 to 10, wherein the logic coupled to the one or more substrates includes transistor channel regions that are positioned within the one or more substrates.

Example 12 may include a method of unsupervised machine learning, comprising mapping a collection of data into two or more mathematical graph representations of the data based on a configurable set of rules that one of preserves or enhances relationships or properties of the data, and organizing the two or more graph representations into two or more clusters of data based on graph information entropy and one or more parameters.

Example 13 may include the method of Example 12, further comprising applying a configurable set of rules that transforms the respective sets of data attributes into two or more graph representations, with node representations for each data attribute and connections and weights between nodes determined by the relationships or properties of the data that need to be enhanced or preserved.

Example 14 may include the method of Example 13, further comprising randomly selecting two or more graph representations as a new cluster candidate, determining a graph information entropy per node of constituent graphs, determining the graph information entropy per node of the new cluster candidate, determining a transition probability for the new cluster candidate based on the one or more parameters and the difference between an average graph information entropy per node of the constituent graphs and the graph information entropy per node of the new cluster candidate, and one of keeping or discarding the new cluster candidate based on the determined transition probability.

Example 15 may include the method of Example 14, further comprising one of removing the constituent graphs if the new cluster candidate is kept or leaving the constituent graphs intact if the new cluster candidate is discarded.

Example 16 may include the method of Example 15, further comprising determining if an end condition is met and, if the end condition is not met, adjusting one or more parameters, randomly or in other suitable way selecting a new group of two or more graph representations as the new cluster candidate, determining the graph information entropy per node of the new cluster candidate based on the adjusted one or more parameters, determining the graph information entropy per node of constituent graph representations based on the adjusted one or more parameters, determining a transition probability for the new cluster candidate based on the adjusted one or more parameters, the graph information entropy per node of the cluster candidate, and the average graph information entropy per node of the constituent graph representations, and one of keeping or discarding the new cluster candidate based on the determined transition probability.

Example 17 may include at least one computer readable storage medium, comprising a set of instructions, which when executed by a computing device, cause the computing device to map a collection of data into two or more mathematical graph representations of the data based on a configurable set of rules that one of preserves or enhances relationships or properties of the data, and organize the two or more graph representations into two or more clusters of data based on graph information entropy and one or more parameters.

Example 18 may include the at least one computer readable storage medium of Example 17, comprising a further set of instructions, which when executed by the computing device, cause the computing device to apply a configurable set of rules that transforms the respective sets of data attributes into two or more graph representations, with node representations for each data attribute and connections and weights between nodes determined by the relationships or properties of the data that need to be enhanced or preserved.

Example 19 may include the at least one computer readable storage medium of Example 18, comprising a further set of instructions, which when executed by the computing device, cause the computing device to randomly or by other suitable way select two or more graph representations as a new cluster candidate, determine a graph information entropy per node of constituent graphs, determine the graph information entropy per node of the new cluster candidate, determine a transition probability for the new cluster candidate based on the one or more parameters and the difference between an average graph information entropy per node of the constituent graphs and the graph information entropy per node of the new cluster candidate, and one of keep or discard the new cluster candidate based on the determined transition probability.

Example 20 may include the at least one computer readable storage medium of Example 19, comprising a further set of instructions, which when executed by the computing device, cause the computing device to one of remove the constituent graphs if the new cluster candidate is kept or leave the constituent graphs intact if the new cluster candidate is discarded.

Example 21 may include the at least one computer readable storage medium of Example 20, comprising a further set of instructions, which when executed by the computing device, cause the computing device to determine if an end condition is met and, if the end condition is not met, to adjust one or more parameters, randomly or in other suitable way select a new group of two or more graph representations as the new cluster candidate, determine the graph information entropy per node of the new cluster candidate based on the adjusted one or more parameters determine the graph information entropy per node of constituent graph representations based on the adjusted one or more parameters, determine a transition probability for the new cluster candidate based on the adjusted one or more parameters, the graph information entropy per node of the cluster candidate, and the average graph information entropy per node of the constituent graph representations, and one of keep or discard the new cluster candidate based on the determined transition probability.

Example 22 may include an unsupervised machine learning apparatus, comprising means for mapping a collection of data into two or more mathematical graph representations of the data based on a configurable set of rules that one of preserves or enhances relationships or properties of the data, and means for organizing the two or more graph representations into two or more clusters of data based on graph information entropy and one or more parameters.

Example 23 may include the apparatus of Example 22, further comprising means for applying a configurable set of rules that transforms the respective sets of data attributes into two or more graph representations, with node representations for each data attribute and connections and weights between nodes determined by the relationships or properties of the data that need to be enhanced or preserved.

Example 24 may include the apparatus of Example 23, further comprising means for randomly or in other suitable way selecting two or more graph representations as a new cluster candidate, determine a graph information entropy per node of constituent graphs, means for determining the graph information entropy per node of the new cluster candidate, means for determining a transition probability for the new cluster candidate based on the one or more parameters and the difference between an average graph information entropy per node of the constituent graphs and the graph information entropy per node of the new cluster candidate, and means for one of keeping or discarding the new cluster candidate based on the determined transition probability.

Example 25 may include the apparatus of Example 24, further comprising means for one of removing the constituent graphs if the new cluster candidate is kept or leaving the constituent graphs intact if the new cluster candidate is discarded.

Example 26 may include the apparatus of Example 25, further comprising means for determining if an end condition is met and, if the end condition is not met, means for adjusting one or more parameters means for randomly or in other suitable way selecting a new group of two or more graph representations as the new cluster candidate, means for determining the graph information entropy per node of the new cluster candidate based on the adjusted one or more parameters, means for determining the graph information entropy per node of constituent graph representations based on the adjusted one or more parameters, means for determining a transition probability for the new cluster candidate based on the adjusted one or more parameters, the graph information entropy per node of the cluster candidate, and the average graph information entropy per node of the constituent graph representations, and means for one of keeping or discarding the new cluster candidate based on the determined transition probability.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An electronic processing system, comprising:
a processor;
memory communicatively coupled to the processor; and
logic communicatively coupled to the processor to:
map a collection of data into two or more graph representations of the data based on a configurable set of rules that one of preserves or enhances relationships or properties of the data, wherein the collection of data is to include one or more of first data that has incomplete attributes for a feature, or second and third data that are associated with a same feature, wherein the second data is to include a first number of attributes for the same feature and the third data is to include a second number of attributes for the same feature, and wherein the first number is to be different from the second number, organize the two or more graph representations into a plurality of clusters of data based on graph information entropy and one or more parameters, select two or more clusters of data of the plurality of clusters of data, wherein the two or more clusters of data are associated with first graph information entropy per node;

merge the two or more clusters of data to generate a merged cluster, wherein the merged cluster is associated with second graph information entropy per node;

determine whether to accept the merged cluster based on a transition probability determined based on a graph information entropy of merging per node, wherein the graph information entropy of merging per node is to indicate whether the second graph information entropy per node is greater than the first graph information entropy per node, wherein the transition probability is to correspond to a probability that the merged cluster is accepted when the graph information entropy of merging per node indicates that the second graph information entropy per node is greater than the first graph information entropy per node;

if the merged cluster is not accepted, select the two or more clusters and discard the merged cluster; and if the merged cluster is accepted, select the merged cluster and discard the two or more clusters.

2. The system of claim 1, wherein the logic is further to:
apply a configurable set of rules that transforms respective sets of data attributes into the two or more graph representations, with node representations for each data attribute and connections and weights between nodes determined by the relationships or properties of the data that need to be enhanced or preserved.

3. The system of claim 2, wherein the logic is further to:
select two or more graph representations as a new cluster candidate;
determine a graph information entropy per node of constituent graphs;
determine a graph information entropy per node of the new cluster candidate;
determine a transition probability for the new cluster candidate based on the one or more parameters and a difference between an average graph information entropy per node of the constituent graphs and the graph information entropy per node of the new cluster candidate; and
one of keep or discard the new cluster candidate based on the determined transition probability for the new cluster candidate.

4. The system of claim 3, wherein the logic is further to:
one of remove the constituent graphs if the new cluster candidate is kept or leave the constituent graphs intact if the new cluster candidate is discarded.

5. The system of claim 4, wherein the logic is further to determine if an end condition is met and, if the end condition is not met, to:
adjust one or more parameters;
select a new group of two or more graph representations as the new cluster candidate;
determine a graph information entropy per node of the new cluster candidate based on the adjusted one or more parameters;
determine a graph information entropy per node of constituent graph representations based on the adjusted one or more parameters;
determine a transition probability for the new cluster candidate based on the adjusted one or more parameters, the graph information entropy per node of the cluster candidate, and the average graph information entropy per node of the constituent graph representations; and
one of keep or discard the new cluster candidate based on the determined transition probability.

6. A semiconductor package apparatus, comprising:
one or more substrates; and
logic coupled to the one or more substrates, wherein the logic is at least partly implemented in one or more of configurable logic or fixed-functionality hardware logic, the logic coupled to the one or more substrates to:
map a collection of data into two or more graph representations of the data based on a configurable set of rules that one of preserves or enhances relationships or properties of the data, wherein the collection of data is to include one or more of first data that has incomplete attributes for a feature, or second and third data that are associated with a same feature, wherein the second data is to include a first number of attributes for the same feature and the third data is to include a second number of attributes for the same feature, and wherein the first number is to be different from the second number,
organize the two or more graph representations into a plurality of clusters of data based on graph information entropy and one or more parameters,
select two or more clusters of data of the plurality of clusters of data, wherein the two or more clusters of data are associated with first graph information entropy per node,
merge the two or more clusters of data to generate a merged cluster, wherein the merged cluster is associated with second graph information entropy per node,
determine whether to accept the merged cluster based on a transition probability determined based on a graph information entropy of merging per node, wherein the graph information entropy of merging per node is to indicate whether the second graph information entropy per node is greater than the first graph information entropy per node, wherein the transition probability is to correspond to a probability that the merged cluster is accepted when the graph information entropy of merging per node indicates that the second graph information entropy per node is greater than the first graph information entropy per node,
if the merged cluster is not accepted, select the two or more clusters and discard the merged cluster, and
if the merged cluster is accepted, select the merged cluster and discard the two or more clusters.

7. The apparatus of claim 6, wherein the logic is further to:
apply a configurable set of rules that transforms respective sets of data attributes into the two or more graph representations, with node representations for each data attribute and connections and weights between nodes determined by the relationships or properties of the data that need to be enhanced or preserved.

8. The apparatus of claim 7, wherein the logic is further to:
select two or more graph representations as a new cluster candidate;
determine a graph information entropy per node of constituent graphs;
determine a graph information entropy per node of the new cluster candidate;
determine a transition probability for the new cluster candidate based on the one or more parameters and a difference between an average graph information entropy per node of the constituent graphs and the graph information entropy per node of the new cluster candidate; and
one of keep or discard the new cluster candidate based on the determined transition probability for the new cluster candidate.

9. The apparatus of claim 8, wherein the logic is further to:
one of remove the constituent graphs if the new cluster candidate is kept or leave the constituent graphs intact if the new cluster candidate is discarded.

10. The apparatus of claim 9, wherein the logic is further to determine if an end condition is met and, if the end condition is not met, to:
adjust one or more parameters;
select a new group of two or more graph representations as the new cluster candidate;
determine a graph information entropy per node of the new cluster candidate based on the adjusted one or more parameters;
determine a graph information entropy per node of constituent graph representations based on the adjusted one or more parameters;
determine a transition probability for the new cluster candidate based on the adjusted one or more parameters, the graph information entropy per node of the cluster candidate, and the average graph information entropy per node of the constituent graph representations; and
one of keep or discard the new cluster candidate based on the determined transition probability.

11. The apparatus of claim 7, wherein the logic coupled to the one or more substrates includes transistor channel regions that are positioned within the one or more substrates.

12. A method of unsupervised machine learning, comprising:
mapping a collection of data into two or more graph representations of the data based on a configurable set of rules that one of preserves or enhances relationships or properties of the data, wherein the collection of data includes one or more of first data that has incomplete attributes for a feature, or second and third data that are associated with a same feature, wherein the second data includes a first number of attributes for the same feature and the third data includes a second number of attributes for the same feature, and wherein the first number is different from the second number;
organizing the two or more graph representations into a plurality of clusters of data based on graph information entropy and one or more parameters;
selecting two or more clusters of data of the plurality of clusters of data, wherein the two or more clusters of data are associated with first graph information entropy per node;
merging the two or more clusters of data to generate a merged cluster, wherein the merged cluster is associated with second graph information entropy per node;
determining whether to accept the merged cluster based on a transition probability determined based on a graph information entropy of merging per node, wherein the graph information entropy of merging per node indicates whether the second graph information entropy per node is greater than the first graph information entropy per node, wherein the transition probability corresponds to a probability that the merged cluster is accepted when the graph information entropy of merging per node indicates that the second graph information entropy per node is greater than the first graph information entropy per node;
if the merged cluster is not accepted, selecting the two or more clusters and discarding the merged cluster; and
if the merged cluster is accepted, selecting the merged cluster and discarding the two or more clusters.

13. The method of claim 12, further comprising:
applying a configurable set of rules that transforms respective sets of data attributes into two or more graph representations, with node representations for each data attribute and connections and weights between nodes determined by the relationships or properties of the data that need to be enhanced or preserved.

14. The method of claim 13, further comprising:
selecting two or more graph representations as a new cluster candidate;
determining a graph information entropy per node of constituent graphs;
determining a graph information entropy per node of the new cluster candidate;
determining a transition probability for the new cluster candidate based on the one or more parameters and a difference between an average graph information entropy per node of the constituent graphs and the graph information entropy per node of the new cluster candidate; and
one of keeping or discarding the new cluster candidate based on the determined transition probability for the new cluster candidate.

15. The method of claim 14, further comprising:
one of removing the constituent graphs if the new cluster candidate is kept or leaving the constituent graphs intact if the new cluster candidate is discarded.

16. The method of claim 15, further comprising determining if an end condition is met and, if the end condition is not met:
adjusting one or more parameters;
selecting a new group of two or more graph representations as the new cluster candidate;
determining a graph information entropy per node of the new cluster candidate based on the adjusted one or more parameters;
determining a graph information entropy per node of constituent graph representations based on the adjusted one or more parameters;
determining a transition probability for the new cluster candidate based on the adjusted one or more parameters, the graph information entropy per node of the cluster candidate, and the average graph information entropy per node of the constituent graph representations; and one of keeping or discarding the new cluster candidate based on the determined transition probability.

17. At least one non-transitory computer readable storage medium, comprising a set of instructions, which when executed by a computing device, cause the computing device to:

map a collection of data into two or more graph representations of the data based on a configurable set of rules that one of preserves or enhances relationships or properties of the data, wherein the collection of data is to include one or more of first data that has incomplete attributes for a feature, or second and third data that are associated with a same feature, wherein the second data is to include a first number of attributes for the same feature and the third data is to include a second number of attributes for the same feature, and wherein the first number is to be different from the second number;

organize the two or more graph representations into a plurality of clusters of data based on graph information entropy and one or more parameters;

select two or more clusters of data of the plurality of clusters of data, wherein the two or more clusters of data are associated with first graph information entropy per node;

merge the two or more clusters of data to generate a merged cluster, wherein the merged cluster is associated with second graph information entropy per node;

determine whether to accept the merged cluster based on a transition probability determined based on a graph information entropy of merging per node, wherein the graph information entropy of merging per node is to indicate whether the second graph information entropy per node is greater than the first graph information entropy per node, wherein the transition probability is to correspond to a probability that the merged cluster is accepted when the graph information entropy of merging per node indicates that the second graph information entropy per node is greater than the first graph information entropy per node;

if the merged cluster is not accepted, select the two or more clusters and discard the merged cluster; and if the merged cluster is accepted, select the merged cluster and discard the two or more clusters.

18. The at least one non-transitory computer readable storage medium of claim 17, comprising a further set of instructions, which when executed by the computing device, cause the computing device to:

apply a configurable set of rules that transforms respective sets of data attributes into the two or more graph representations, with node representations for each data attribute and connections and weights between nodes determined by the relationships or properties of the data that need to be enhanced or preserved.

19. The at least one non-transitory computer readable storage medium of claim 18, comprising a further set of instructions, which when executed by the computing device, cause the computing device to:

select two or more graph representations as a new cluster candidate;

determine a graph information entropy per node of constituent graphs;

determine a graph information entropy per node of the new cluster candidate;

determine a transition probability for the new cluster candidate based on the one or more parameters and a difference between an average graph information entropy per node of the constituent graphs and the graph information entropy per node of the new cluster candidate; and one of keep or discard the new cluster candidate based on the determined transition probability for the new cluster candidate.

20. The at least one non-transitory computer readable storage medium of claim 19, comprising a further set of instructions, which when executed by the computing device, cause the computing device to:

one of remove the constituent graphs if the new cluster candidate is kept or leave the constituent graphs intact if the new cluster candidate is discarded.

21. The at least one non-transitory computer readable storage medium of claim 20, comprising a further set of instructions, which when executed by the computing device, cause the computing device to determine if an end condition is met and, if the end condition is not met, to:

adjust one or more parameters;

select a new group of two or more graph representations as the new cluster candidate;

determine a graph information entropy per node of the new cluster candidate based on the adjusted one or more parameters;

determine a graph information entropy per node of constituent graph representations based on the adjusted one or more parameters;

determine a transition probability for the new cluster candidate based on the adjusted one or more parameters, the graph information entropy per node of the cluster candidate, and the average graph information entropy per node of the constituent graph representations; and one of keep or discard the new cluster candidate based on the determined transition probability.

* * * * *